Figure 1:
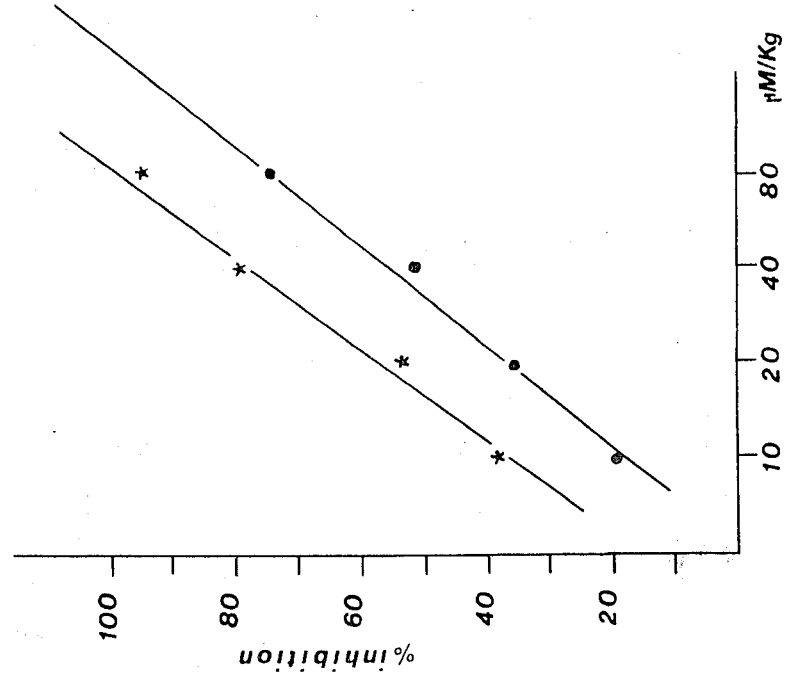
Figure 2:
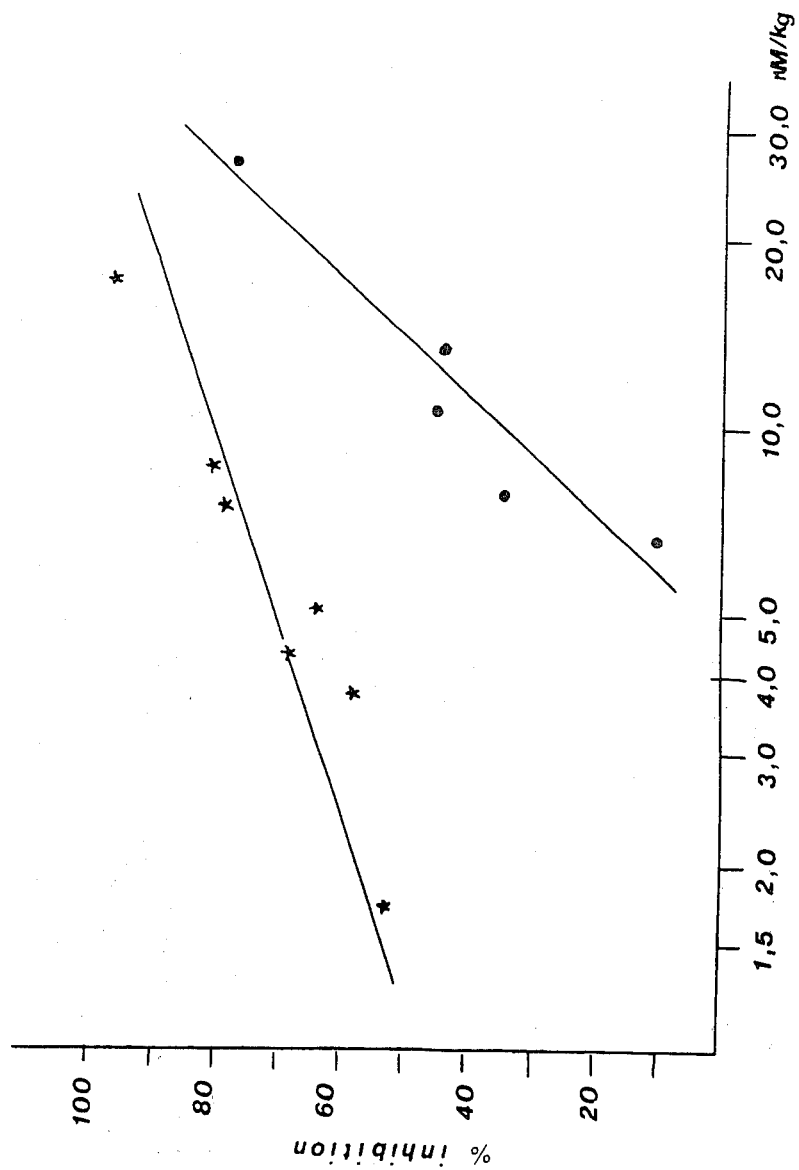
Figure 3:
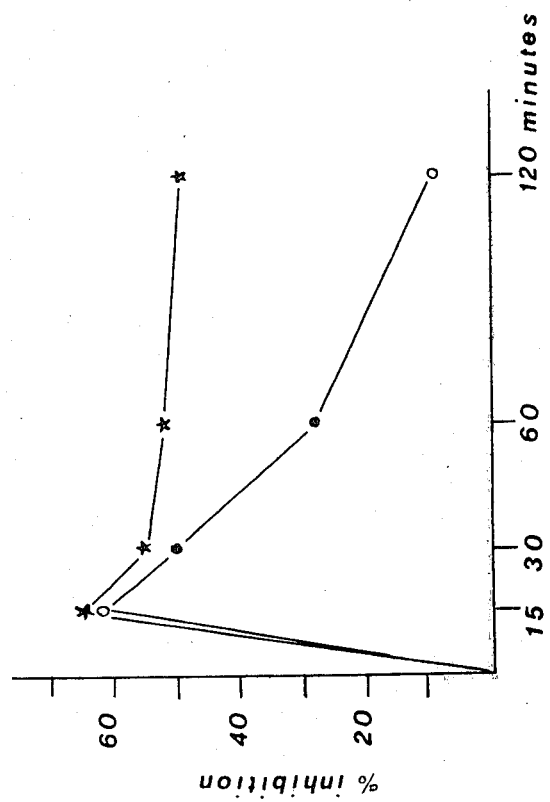
Figure 4:
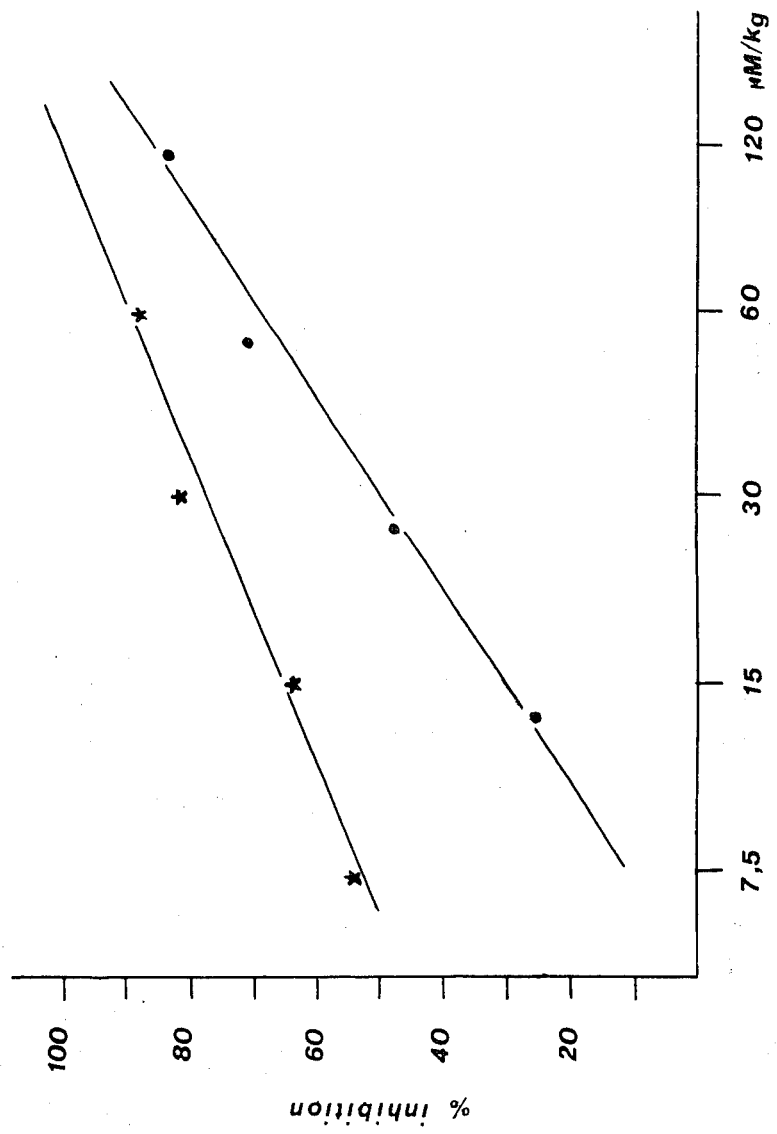
Figure 5:
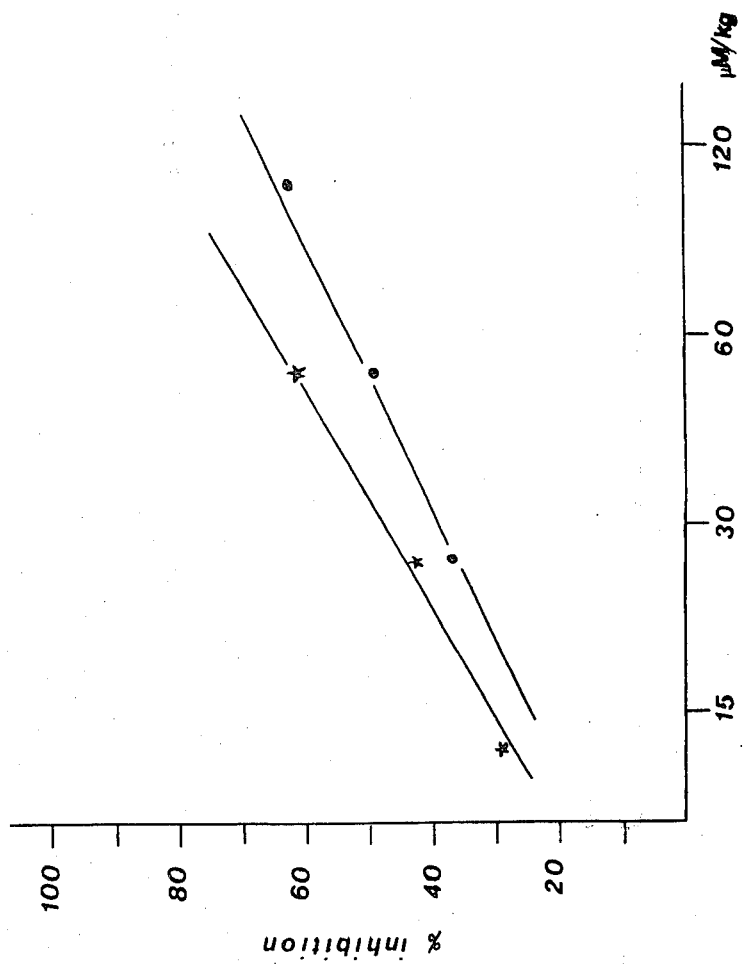

United States Patent

Della Bella et al.

[11] 3,923,805
[45] Dec. 2, 1975

[54] PROPOXYPHENE DERIVATIVE

[75] Inventors: Davide Della Bella; Arnaldo Gandini, both of Milan; Dario Chiarino, Monza; Vittorio Ferrari, Milan, all of Italy

[73] Assignee: Whitefin Holding S.A., Lugano, Switzerland

[22] Filed: Dec. 27, 1972

[21] Appl. No.: 318,766

[30] Foreign Application Priority Data
Dec. 30, 1971 Italy .................................... 3312/71

[52] U.S. Cl. .............................. 260/253; 424/253
[51] Int. Cl.² ........................................ C07D 473/10
[58] Field of Search ..................... 260/253

[56] References Cited
UNITED STATES PATENTS
2,703,803  3/1955  Raymond et al. ..................... 260/253
3,190,920  6/1965  Spickett et al. ........................ 260/253

OTHER PUBLICATIONS
Merck Index, Eight edition 1968 p. 875 and 1033–1034.

Primary Examiner—Richard J. Gallagher
Assistant Examiner—Anne Marie T. Tighe
Attorney, Agent, or Firm—Stevens, Davis, Miller & Mosher

[57] ABSTRACT

The compound of formula

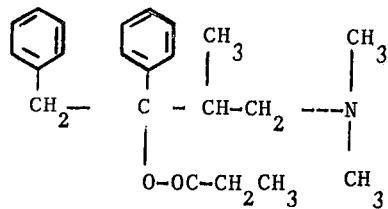

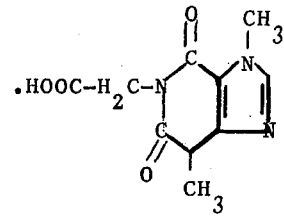

as well as the process for its preparation and the therapeutic compositions containing the same.

1 Claim, 6 Drawing Figures

PROPOXYPHENE DERIVATIVE

The present invention refers to a new compound endowed with therapeutic activity, to the process for the preparation thereof and to the pharmaceutical compositions containing the same.

It is known that the propoxyphene is endowed with analgetic activity (Merck Index, VIII ed. page 875). It is also known (British Pat. No. 1,081,105) that the analgetic activity of propoxyphene may be enhanced by the addition of another analgetic compound, namely butazone. On the contrary there is no known propoxyphene derivative having a higher activity than propoxyphene, nor a compound whatever able to act as a synergic for propoxyphene.

It has now been found that if propoxyphene is made to react with theobromineacetic acid (the latter compound being a well known diuretic, quite deprived of any analgetic activity — Merck Index, VIII Ed., page 1033), a compound is obtained having an analgetic activity much higher than that of propoxyphene.

FIGS. 1–6 show graphically a comparison of properties of the compound of the invention with those of d-propoxyphene.

The new compound according to the invention is α-d-4-dimethylamino-3-methyl-1,2-diphenyl-2-propionyloxy-butane theobromineacetate of the formula

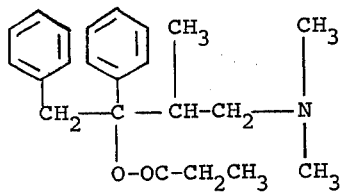 · 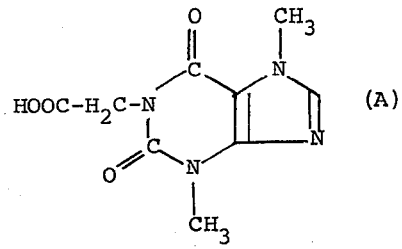  (A)

The new compound according to the present invention may be prepared by dissolving both the propoxyphene and the theobromineacetic acid in an anhydrous organic solvent which can be eliminated by evaporation under vacuum or in anhydrous organic solvent wherein the starting products are soluble while the end product is insoluble. The end product can thus be separated by filtration.

More precisely the new compound may be prepared according to the following process:

330 g (0.96 Moles) of propoxyphene are dissolved under heating into 3000 ml of absolute ethanol.

Grams 229 (0.96 Moles) of theobromineacetic acid are added to the so obtained solution all at once. The mixture is stirred under heating up to incipient boiling to obtain a complete solution which is heat filtered under slight vacuum.

The filtrate is introduced in a rotating evaporator and the ethanol is completely eliminated at 70°C under vacuum (30 Tor). The colorless end crystalline residue obtained is dried under high vacuum at 40°C for 12 hours.

Melting point: in an open capillary and with a heating rate of 3° per minute the material melts without decomposition between 88° and 92°C. The melting point in the equilibrium diagram is 91.2°C.

Specific Rotation at 25°C: +37.5° ± 1.5° (c = 1% in water).

The comparison between the analgetic activity of the new compound according to the present invention (A) and that of propoxyphene has been performed through the tests of stretching (Koster R. et al; Fed. Proc. 1959, 18,412), of tail flick in rats (Bass W. B., Wander Brook M. J., J. A. Ph. A., 1952, 41, 569) of Randall-Selitto in rats (Randall L. O., Selitto J. J., Arch. Int. Pharmacodyn. 1957, 111,409).

The results of the above tests are summarized in Table 1 and the data is plotted in the graphs in FIGS. 1 to 5.

TABLE 1

| Test | Administration route | ED/50 A $\mu$M/kg | A mg/kg | d-propoxyhene HCl $\mu$M/kg | d-propoxyhene HCl mg/kg |
|---|---|---|---|---|---|
| Stretching | os | 15.5 | 8.9 | 33.0 | 12.4 |
|  | s.c. | 1.1 | 0.6 | 13.8 | 5.2 |
| Tail flick | s.c. | 6.1 | 3.5 | 29.0 | 11.2 |
| Randall-Selitto | s.c. | 33.4 | 19.3 | 50.6 | 19.1 |

The administration of compound (A) to empty dogs, by oral route and in doses of 30 mg/kg has revealed no intolerance phenomena. The same result has been attained by subcutaneously administering to dogs 1 or 2 vials of compound (A), each vial containing 50 mg/ml of said compound.

Single doses up to 2 mg/kg of compound (A), administered to cats narcotized with chloralose, through the femoral vein, have caused no alteration of blood pressure. In no case has there been noted any alteration of breath or of ortho-or para-sympathetic regulation.

The administration by perfusion through the femoral vein of compound (A) (250 γ/kg/minute), under artificial respiration, has been endured over about three hours for an overall dose equivalent to about 45 mg/kg. In so far as acute toxicity is concerned, the tests have been performed by utilizing male mice and rats both of female and male sex. The DL 50 values are reported in Table 2.

TABLE 2

| Animal | Sex | Administration route | (A) mM kg | (A) mg/kg | d-propoxyphene.HCl mM/kg | d-propoxyphene.HCl mg/kg |
|---|---|---|---|---|---|---|
| mouse | male | os | 0.58 | 335 (251–435) (°) | 0.48 | 182 (105–249) |
|  | male | s.c. | 0.29 | 168 (151–186) | 0.27 | 102 (95–109) |
|  | male | os | 0.72 | 420 | 0.52 | 195 |

TABLE 2-continued

| Animal | Sex | Administration route | DL₅₀ | | | |
|---|---|---|---|---|---|---|
| | | | (A) | | d-propoxyphene.HCl | |
| | | | mM kg | mg/kg | mM/kg | mg/kg |
| rat | male | s.c. | 0.27 | (323–546) 160 (110–232) | 0.30 | (156–243) 114 (95–136) |
| | male | i.v. | 0.06 | 34.8 (31.4–38.2) | 0.059 | 22.5 (19.7–26.7) |
| | female | os | 0.70 | 405 (349–470) | 0.61 | 230 (171–310) |

(*) The values in parentheses indicate the fiduciary limits at 95%, reckoned according to the method of Litchfield o Wilcoxon (J.Pharmacol.Exper.Therap.,1949,96,99)

In so far as subacute toxicity is concerned, male rats have been used, treated with compound (A) according to the following scheme:

group A = 100 mg/kg/os pro die over 2 weeks
group B = 100 mg/kg/os pro die over 4 weeks
group C = 50 mg/kg/os pro die over 4 weeks At the end of the test the following parameters have come under consideration for each animal: mortality, food consumption, body weight, macroscopic examination, weight of parenchymal organs, analysis of urine, hemochromocitometric and hematochemical analysis. None of the treated animals has revealed a significant variation with respect to the control animals, for the considered parameters.

The analgetic activity of compound (A) has resulted also in the clinical tests higher than that of d-propoxyphene hydrochloride. To 93 patients of female sex suffering of post-operation pains have been administered:

83 mg of d-propoxyphene hydrochloride
130 mg (equimolecular dose) of compound (A)
placebo of identical appearance Each treatment was performed by administering 2 ml of sterile solution of the compounds contained into identical vials, with a single code. The administrations have been performed by intermuscular route. This administration route has been preferred as suitable for patients under post-operation conditions.

The patients have been assigned to one of the three treatment groups at random, so that to obtain 3 randomized groups, each containing 31 subjects.

The groups were homogeneous, that is not significantly different in so far as the essential characteristics were concerned, such as sex, age, body weight, kind of operation and initial index of pain intensity. The most of operations were istereoectomia and ovaryectomia. The test was performed as a double-blind test.

The compositions were administered about two hours after the operation was ended; the intensity of pain of the patients was determined by means of a standard questionnaire before the treatment and after the treatment at pre-determined, regular intervals of time.

The intensity of pain was evaluated according to the following indexes: no pain: index 0; slight pain: index 1; moderate pain: index 2; intense pain: index 3; very intense pain: index 4.

The average intensity of pain before any treatment was identical for the three groups (the average value was of 2.93 for the group of placebo; 3.09 for the group of d-propoxyphene hydrochloride and 2.90 for the group treated with the compound (A).

The difference in pain intensity (DIP) of each patient, at each time interval after the treatment, as referred to the intensity initially evaluated, was used as measure of analgetic activity. The global comparison of the three treatments, with reference to the average indexes (DIP) at each hour, was statistically analyzed by analyzing the one-way variance according to Kruskal-Wallis.

When justified by the data of the statistical analysis, three coupled comparisons were performed (each active treatment versus the placebo and versus the other active treatment) according to the test of Mannwhitney.

The probability $P \leq 0.05$ was used as the level of statistical significance.

The above mentioned statistical methods have been already used by Bloomfield et al. (Clin. Pharm. & Ther. 11, 747–754, 1971) in a similar analysis of analgetic activity.

Figure 6:
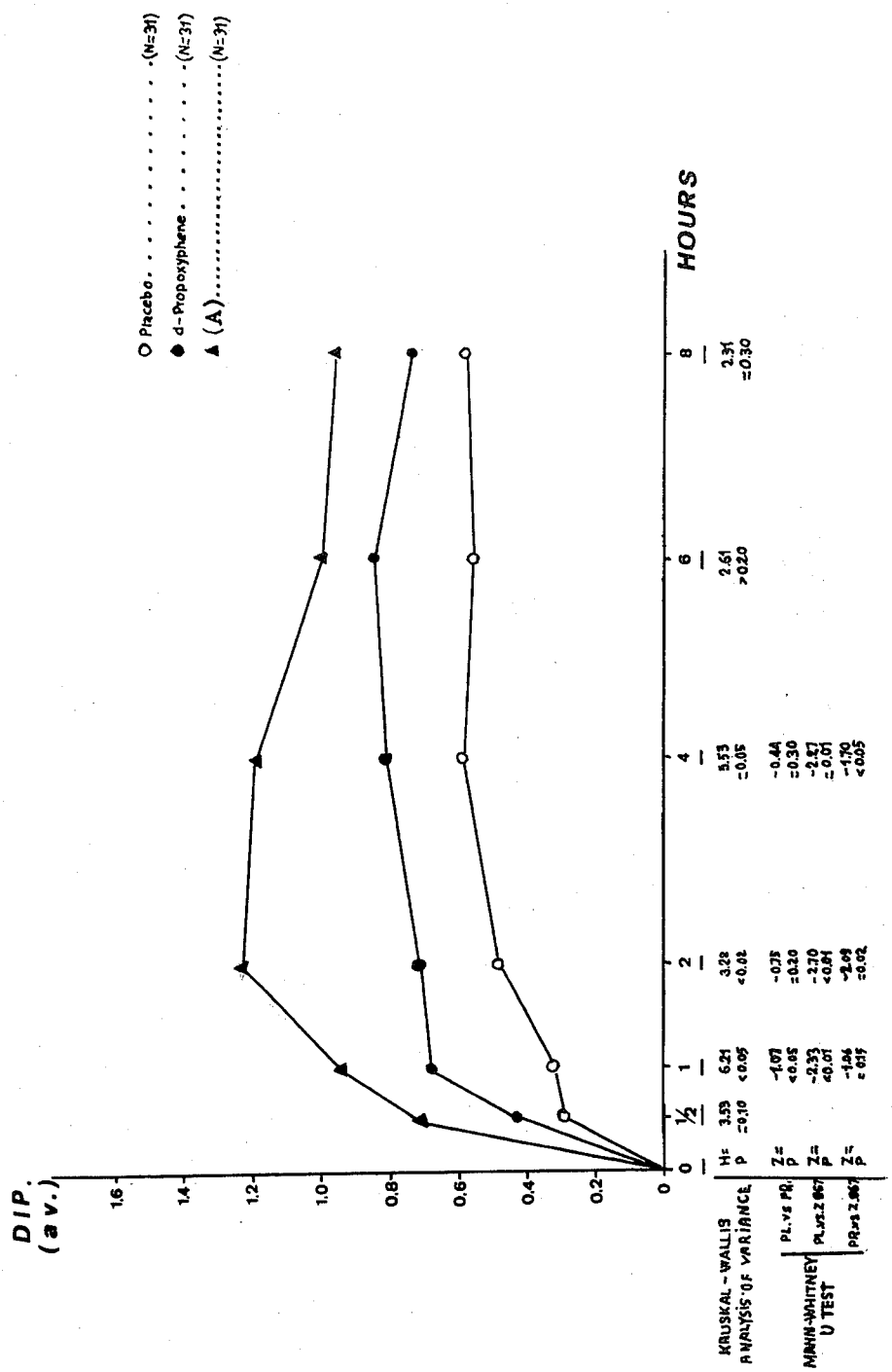

The average curve time-activity and the results of the statistical analysis are given with the graph of FIG. 6. As it can be seen, a global significant difference may be observed among the various treatments at the 1st, 2nd and 3rd hour after the administration.

Under the considered experimental conditions, the d-propoxyphene hydrochloride has shown remarkably more efficacious than the placeblo only at the first hour after administration thereof. The compound (A) has shown to be significantly more efficacious than the placebo at the 1st, 2nd and 4th hour so indicating a higher intensity and activity duration with respect to the d-propoxyphene hydrochloride. Under the adopted conditions, no significant side-effect has been noted for any of the performed treatments.

Also the results of other clinical tests performed with compound (A) in symptomatology of pain of different origin (for example cancer, post-delivery, arthritis, renal colic) indicate that compound (A) is a more efficacious analgesic and with more long-lasting activity than d-propoxyphene hydrochloride both by parentheral and oral administration.

The new compound according to the invention may be administered by oral parentheral or rectal route in combination with therapeutically acceptable additives, diluents or carriers usually used in the pharmaceutical industry to prepare all the pharmaceutical compositions suitable for said administration routes, such as tablets, sugar-coated pills, capsules, suppositories and vials.

Some examples of these compositions are indicated hereinafter:

EXAMPLE 1

Capsules to be orally ingested

| | |
|---|---|
| compound (A) porous micronized | 100 mg 20 mg |

-continued

| | |
|---|---|
| silica gel | |
| talc | 5 mg |

Grams 350 of compound (A) and 70 g of porous micronized silica gel are placed in a cubic mixer and mixed over 15 minutes. To the thus obtained mixture, after passing two times through a sieve at 200m/cm², 17.5 g of talc are added and the whole is again admixed for further 15 minutes in a cubic mixer.

Nearly 3500 capsules of hard gelatin number 4 are filled with the above obtained mixture.

EXAMPLE 2

Solution to the parentherally injected

| | |
|---|---|
| Composition for each vial | |
| compound (A) | 139.75 mg |
| lidocaine hydrochloride, H₂O | 10.75 mg |
| hydrochloric acid 6 N | q.s. ad pH = 4 |
| propylene glycol | 1.72 ml |
| water for injection | q.s. ad 2.15 ml |

Grams 209.625 of compound (A) and 16.125 g of lidocaine hydrochloride are dissolved under stirring at room temperature into 3 liters of solvent consisting of 80 parts by volume of propylenglycol and 20 parts by volume of water for injection.

6 N hydrochloric acid is added up to pH=4 and then the volume of the solution is adjusted to 1 3.225 with the same solvent. It is filtered through a sterilizing membrane of 3.0μ and 2.15 ml of solution is introduced in each vial of colourless glass.

In this manner 1500 vials are obtained which are sterilized at 121°C over 20 minutes in an autoclave.

We claim:

1. The compound of the formula,

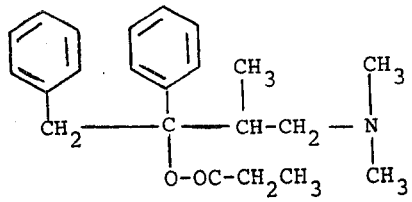

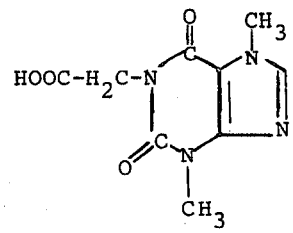

* * * * *